July 14, 1942. H. T. RANDALL 2,289,453
WINDER
Filed May 23, 1940
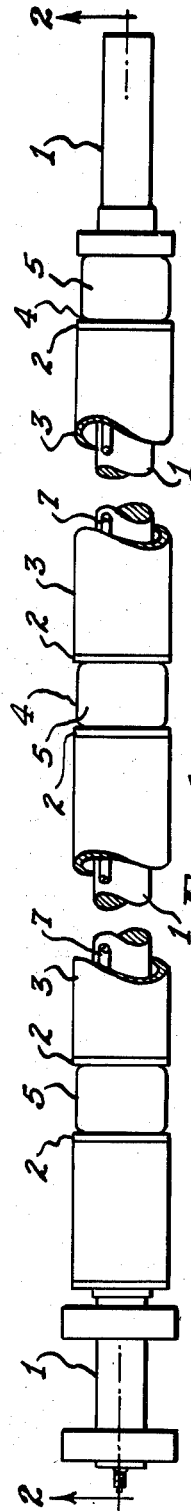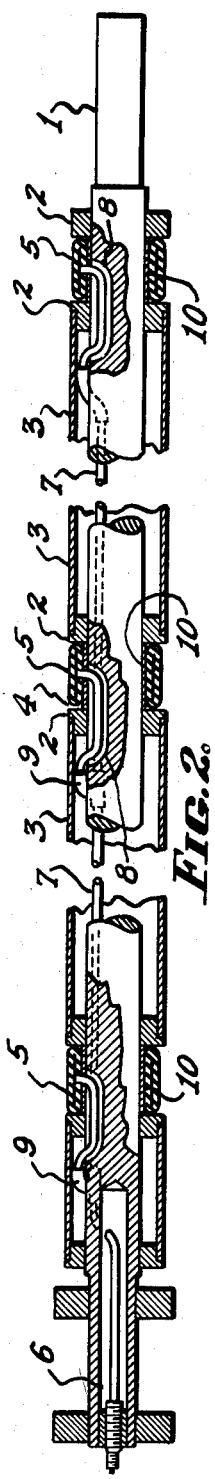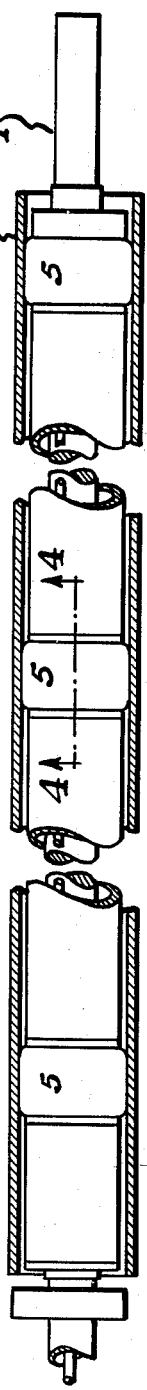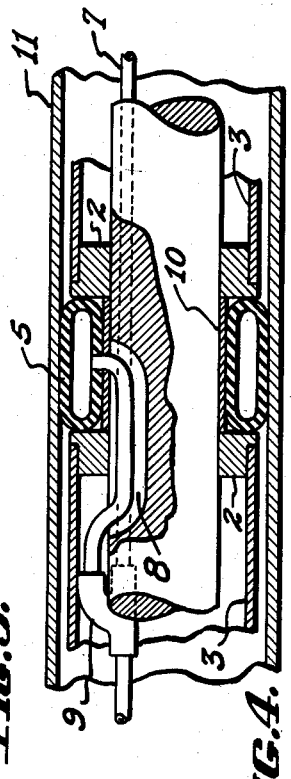
INVENTOR.
HERBERT T. RANDALL.
BY
Allen & Allen
ATTORNEYS.

Patented July 14, 1942

2,289,453

UNITED STATES PATENT OFFICE 2,289,453

WINDER

Herbert T. Randall, Hamilton, Ohio

Application May 23, 1940, Serial No. 336,813

4 Claims. (Cl. 242—72)

My invention relates to winding machines such as are used for winding rolls of paper or other flexible webs, and more particularly to the spindles for such machines.

In my application, Serial No. 333,176 filed May 3, 1940, I have shown and described a mechanism for this purpose, the present application being for a modified form of device.

It is the object of my invention to provide a pneumatic expanding spindle or core shaft upon which to mount the cores or shells upon which a web is to be wound. By the use of this spindle or core shaft it is possible to mount a winder core thereon and remove it therefrom quite rapidly and without the use of collars and set screws, as well as to provide a lengthwise adjustment of the core along the spindle without any difficulty, since the expanding spindle will hold the sleeve in a wide range of positions. In my application now on file, I locate about a hollow shaft, an expansible rubber sleeve, which is vulcanized or otherwise very tightly bound at its ends to the shafts. In the present instance I avoid the presence of a rubber covering on the shaft, and I do this by building up a composite shaft with a series of circumferential pockets in which I locate expansible tubes like inner tubes of motor vehicle tires. In this way I have a smooth metallic body as a spindle but can expand it at the several points where the tubes are located, after a winder roll shell has been adjusted in position. By the use of an ordinary automobile tire valve in the end of the shaft and an air pipe connected up to the tubes, I can readily inflate the rubber tubes or deflate them at will. The winder cores or shells will slip over the spindle without obstruction when the tubes are deflated, but will be held fast by the tubes when they are inflated. The winder core may be of whatever length is required for any operation, and as long as a substantial portion thereof is engaged by the expanding rubber tubes, it can be located so as to line up with the line of delivery of the web to be wound.

An example of my invention is shown in the drawing and will be described in the matter that follows. The novel and patentable feature inherent in my invention of which the described device is an example, will be set forth in the appended claims to which reference is hereby made.

Figure 1 is an elevational view with parts broken away.

Fig. 2 is a section on the line 2—2 of Fig. 1.

Fig. 3 is a view similar to Fig. 1, but showing the tubes expanded to engage a core or shell, and Fig. 4 is a section taken on line 4—4 of Fig. 3.

I have shown my spindle member as a composite piece but it may be of one solid piece, if desired. Specifically I have provided a shaft 1, on which are mounted spacers 2, 2, at various points, and the spacers are connected together by sleeves 3. The sleeves form the outside of the spindle, and by spacing the sleeves and their spacer pieces 2, I provide a series of circumferential pockets 4 around the completed spindle.

In these pockets I locate inflatable rubber tubes 5, which will normally in collapsed state, lie within the pockets, so as not to cause an obstruction in slipping on a winder core and removing it.

The one end of the shaft 1 is preferably made hollow as at 6 and is fitted with a Schrader valve of usual type used in motor vehicle tires. From this valve a conduit, in the form of a small pipe 7 extends out through the shaft, thence along between the several sleeves on the shaft to connect up with each of the tubes 5. The shaft is ground out as at 8, at the points necessary for the pipe to pass under the spacers at the point necessary to engage with the tubes, as shown. To permit the pipe to pass through the spacers, they will be formed with suitable grooves for this purpose. At each tube a by-pass union is located as indicated at 9.

I have indicated at 10, sleeves fitted over the central shaft between the spacers to form a backing for the tubes, and to provide a correct lengthwise spacing of the sleeves from each other.

In the form shown I have used at one end of the shaft instead of a sleeve, a larger diameter spacer, since there is only a short lengthwise distance to cover.

In operation the spindle will be removed from the winder and the valve released to permit deflation. A core 11 will then be slipped over the spindle in which the tubes are pocketed, and the spindle mounted in the winder. The operator threads the web to be wound through the winder and lines up the shell or core with the trimmed edges of the web. The shell will be of a length equal to the width of the web to be wound up. Where slitters are used, they may be set and the core or shell be positioned to accommodate the position of the slitters.

When the core is in the correct position an air pressure hose is applied to the valve in the spindle to inflate the rubber tubes. In the devices in use according to my description above, 100 pounds pressure has been used with success.

There is none of the difficulty of lock nuts, set screws, conical collars and the like which are used in winders with which I am familiar. The changing of cores is accomplished by removing the spindle and bleeding the valve whereupon the mounted core becomes loose. There is no necessity of locking up the core before mounting the spindle in the winder thus necessitating careful measurements as a preliminary to location of the core. In my device the core is adjusted to position after it is in the machine as has been described.

Having thus described my invention, what I claim as new and desire to secure by Letters Patent is:

1. A core shaft for winder cores having a cylindrical body, said shaft having a series of axially spaced circumferential pockets therein and presenting otherwise a cylindrical support for a winder tube, inflatable tubes in said pockets, and means for inflating and deflating said tubes, said tubes and pockets so arranged that the tubes project beyond the surface of said cylindrical body when inflated.

2. A core shaft for winder cores having a cylindrical body, said shaft having a series of axially spaced circumferential pockets therein and presenting otherwise a cylindrical support for a winder tube, inflatable tubes in said pockets, and means for inflating and deflating said tubes, said shaft having passageways extending from one end thereof to each tube, and a conduit connecting with each tube, the same constituting the means for inflating and deflating the tubes, said tubes and pockets so arranged that the tubes project beyond the surface of said cylindrical body when inflated.

3. A core shaft for winder cores, said shaft having a series of axially spaced circumferential pockets therein, inflatable tubes in said pockets, and means for inflating and deflating said tubes, said shaft being formed of an inner shaft member, annular spacers on said shaft member and sleeves thereon mounted on the spacers and so arranged that parts between certain of the spacers remain unoccupied by the sleeves, said parts between the spacers not occupied by the sleeves constituting the circumferential pockets.

4. A core shaft for winder cores having a cylindrical body, said shaft having a series of axially spaced circumferential pockets therein, and presenting otherwise a cylindrical support for a winder tube, inflatable tubes in said pockets, and means for inflating and deflating said tubes, comprising a conduit extending out through one end of the shaft and having connections with each of the tubes, said conduit having a valve on the outer end of the type of a bleedable check valve said tubes and pockets so arranged that the tubes project beyond the surface of said cylindrical body when inflated.

HERBERT T. RANDALL.